(12) United States Patent
Fujita

(10) Patent No.: US 10,581,368 B2
(45) Date of Patent: Mar. 3, 2020

(54) SURGE SUPPRESSION CIRCUIT AND INVERTER DRIVE MOTOR SYSTEM

(71) Applicant: FUJI ELECTRIC CO., LTD., Kanagawa (JP)

(72) Inventor: Miwako Fujita, Tokyo (JP)

(73) Assignee: FUJI ELECTRIC CO., LTD., Kawasaki-shi, Kanagawa (JP)

( * ) Notice: Subject to any disclaimer, the term of this patent is extended or adjusted under 35 U.S.C. 154(b) by 0 days.

(21) Appl. No.: 16/043,516

(22) Filed: Jul. 24, 2018

(65) Prior Publication Data

US 2018/0331650 A1    Nov. 15, 2018

Related U.S. Application Data

(63) Continuation of application No. PCT/JP2017/028678, filed on Aug. 8, 2017.

(30) Foreign Application Priority Data

Aug. 30, 2016 (JP) ................................ 2016-167720

(51) Int. Cl.
  *H02P 27/08*   (2006.01)
  *H02P 29/024*  (2016.01)
  *H02M 5/458*   (2006.01)

(52) U.S. Cl.
  CPC ........ *H02P 29/0241* (2016.02); *H02M 5/458* (2013.01); *H02P 27/08* (2013.01)

(58) Field of Classification Search
  CPC ...... H02P 29/0241; H02P 27/08; H02M 5/458
  USPC .......................................................... 361/33
  See application file for complete search history.

(56) References Cited

U.S. PATENT DOCUMENTS

| | | | | |
|---|---|---|---|---|
| 5,686,806 A * | 11/1997 | Hibbard | ................. | H02H 9/005 307/105 |
| 5,784,236 A * | 7/1998 | Tardiff | .................... | H02H 9/04 361/111 |
| 5,990,654 A * | 11/1999 | Skibinski | ............. | H02M 1/126 307/105 |
| 7,848,122 B2 * | 12/2010 | Tallam | .................. | H02M 1/126 307/105 |

(Continued)

FOREIGN PATENT DOCUMENTS

JP   S60-255064   12/1985
JP   S61-022754   1/1986

(Continued)

*Primary Examiner* — Kawing Chan
(74) *Attorney, Agent, or Firm* — IPUSA PLLC

(57) ABSTRACT

The present invention relates to a surge suppression circuit connected between an output end of an inverter INV and a cable 100 to drive a motor M that is connected to the output end of the inverter INV via the cable 100, and relates to a motor drive system in which the surge suppression circuit is used. The surge suppression circuit 300 includes an inductance L and a resistor R connected in parallel with the inductance L. The resistor R is set so as to match, or so as to be less than, an impedance of zero-phase component of the cable 100. A surge suppression circuit and an inverter drive motor system are enabled to be applied to a low-voltage small-capacity inverter with no DC voltage neutral terminal, and enabled to reduce the zero-component of the surge voltage according to the connection to the output end of the inverter.

8 Claims, 7 Drawing Sheets

(56) References Cited

U.S. PATENT DOCUMENTS

| | | | | |
|---|---|---|---|---|
| 10,158,314 B2* | 12/2018 | Royak | ............... | H02P 27/06 |
| 10,389,213 B2* | 8/2019 | Xiao | ............... | H02K 11/022 |
| 2003/0127728 A1* | 7/2003 | Audet | ............... | H01L 23/50 |
| | | | | 257/713 |
| 2005/0213783 A1* | 9/2005 | Walsh | ............... | H03F 3/181 |
| | | | | 381/120 |
| 2012/0014143 A1* | 1/2012 | Schueneman | ......... | H02M 1/126 |
| | | | | 363/40 |
| 2012/0187894 A1* | 7/2012 | Higuchi | ............ | H02M 1/126 |
| | | | | 318/811 |

FOREIGN PATENT DOCUMENTS

| | | |
|---|---|---|
| JP | H06-112048 | 4/1994 |
| JP | 2001-204136 | 7/2001 |
| JP | 2002-057542 | 2/2002 |
| JP | 2004-343832 | 12/2004 |
| JP | 2008-283755 | 11/2008 |
| JP | 2008-301555 | 12/2008 |
| JP | 2010-041790 | 2/2010 |

* cited by examiner

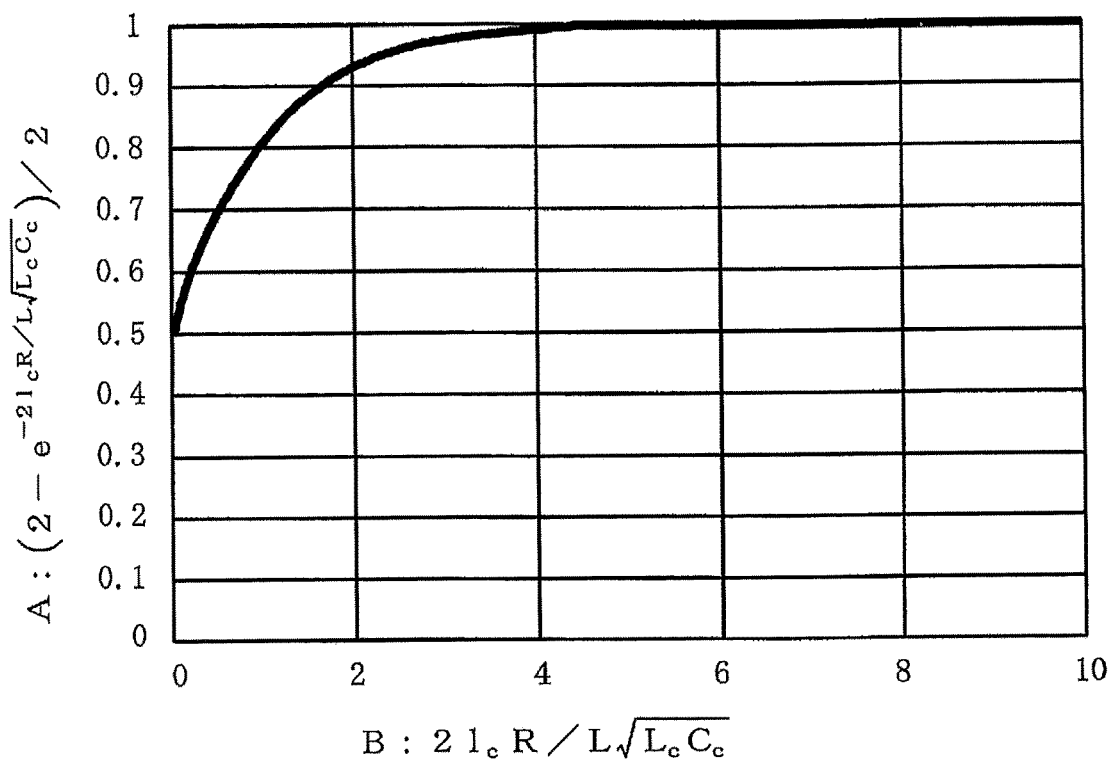
FIG.4
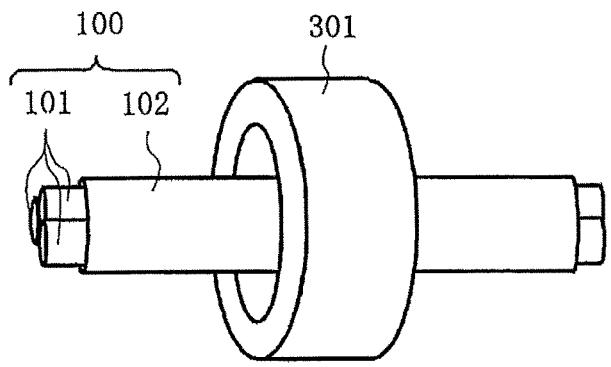
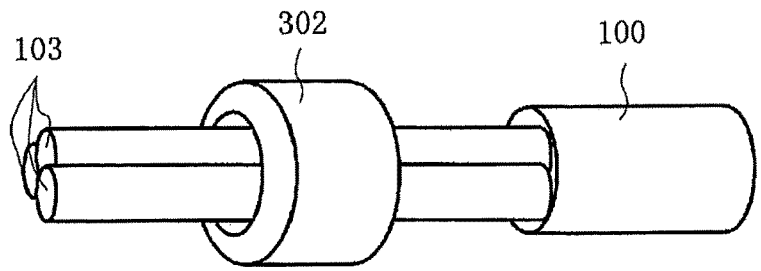

US 10,581,368 B2

SURGE SUPPRESSION CIRCUIT AND INVERTER DRIVE MOTOR SYSTEM

CROSS-REFERENCE TO RELATED APPLICATIONS

The present application is a continuation application of International Application No. PCT/JP2017/028678 filed on Aug. 8, 2017, which claims priority to Japanese Patent Application No. 2016-167720 filed on Aug. 30, 2016. The contents of these applications are incorporated herein by reference in their entirety.

BACKGROUND OF THE INVENTION

1. Field of the Invention

The present invention relates to a surge voltage suppression technique in an inverter drive motor system that controls an output voltage waveform via an inverter including a semiconductor switching element (hereinafter, referred to as a switching element), and provides power to a motor via a cable.

2. Description of the Related Art

FIG. 8 is a schematic diagram of this type of an inverter drive motor system.

In FIG. 8, an input side of an inverter INV is connected to a three-phase alternate current power supply AC such as a commercial power supply, via a smoothing capacitor $C_{dc}$, a converter (rectifier circuit) CONV, and a transformer TR in this order. Further, an output side of the inverter INV is connected to a motor M via a cable 100. It should be noted that D1 through D6 are rectifier diodes, S1 through S6 are switching elements such as an IGBT (Insulated Gate Bipolar Transistor).

In this inverter drive motor system, a three-phase alternate current voltage, input from the three-phase alternate current power supply AC via the transformer TR, is converted to a direct current voltage by the converter CONV. The direct current voltage is smoothed by the smoothing capacitor $C_{dc}$ as a direct current intermediate circuit, and is supplied to the inverter INV. The inverter INV converts the input direct current voltage to a three-phase alternate current voltage with a freely-selected voltage and frequency, and supplies the converted voltage to the motor M, and causes the motor M to rotate at a desired speed.

It should be noted that, in FIG. 8, a control circuit (not shown) that controls the switching elements S1 to S6 are omitted.

The converter CONV is not required to include the diode rectifier circuit as illustrated in the figure, but may include, similar to the inverter INV, switching elements such as an IGBT. In this case, the converter functions as what is called a PWM converter that converts an alternate current voltage to a direct current voltage according to PWM control.

In this type of motor system, the switching elements S1-S6 are often switched ON and OFF at a frequency of, for example, several units of [kHz] to ten plus single units of [kHz]. In this case, the output voltage of the inverter INV is a pulse voltage that rises and falls steeply. With respect to the above, the impedance of the motor M is significantly greater than the characteristic impedance of the cable 100, and the impedance of the inverter INV is significantly less than the characteristic impedance of the cable 100. As a result, when power is supplied to the motor M from the inverter INV, a positive reflection of the voltage occurs at the receiving end of the motor M, and a negative reflection occurs at the output end of the inverter INV. According to the above, a voltage, that has about two times wave height and amplitude of the voltage at the output end of the inverter INV, is applied to the receiving end of the motor M as a surge voltage.

The surge voltage that has been applied to the receiving end of the motor M is propagated in the motor M, causes dielectric breakdown between the lines or between the ground, or causes the shortened lifetime of an insulation section of the winding according to a partial discharge. Further, the winding near the receiving end of the motor M has a high share ratio of the applied surge voltage, and, in particular, the share ratio increases as the surge voltage rises more steeply. Therefore, in the case where the switching speed of the inverter INV is faster, an insulation stress of the winding near the receiving end of the motor M becomes high, and, the insulation deterioration or the dielectric breakdown tends to occur. Therefore, a technique, with which the surge voltage is effectively suppressed, has been desired to be realized.

Here, before describing conventional surge voltage suppression techniques, "zero-phase component" and "symmetrical component" will be described. The three-phase voltage with a predetermined reference potential can be separated into a first component and a second component. The first component is obtained by multiplying a sum of instantaneous values of phase voltages by one third, and the second component is obtained by subtracting the first component from the sum of the instantaneous values of the phase voltages. The above-described first component is referred to as a zero-phase component. In the three-phase three-wire circuit, the zero-phase component is a voltage component that causes a current flowing into the ground via a stray capacitance of the circuit, etc. Further, a sum of three-phase surge voltages for the ground is not zero, and thus, the zero-phase component is included in the surge voltage.

In the motor system illustrated in FIG. 8, the theoretically calculated result of the surge voltage at the receiving end of the motor M is illustrated in FIG. 9. The target of this calculation example is a system in which the converter as the PWM converter in FIG. 8 is controlled together with the inverter according to the PWM control, and an induction motor, that is connected from the inverter via a 100 [m] three-core shielded cable with 5.5 [mm$^2$] sectional area, is driven by the system. A zero-phase component included in the surge voltage in FIG. 9 includes a component that is generated according to the switching operations of the inverter and a component that is generated according to the PWM rectification operations of the converter, and a surge voltage, in which the both components are superimposed, is applied to the receiving end of the motor.

With respect to the above, the above-described second component of the three-phase voltage is referred to as symmetrical components, and a sum of the instantaneous phase values is zero. With respect to the symmetrical components, a component, that is generated according to the switching operations of the inverter, is applied to the receiving end of the motor as a surge voltage.

As a method of suppressing this type of surge voltage, there is a method illustrated in FIG. 10. In FIG. 10, a surge suppression circuit 200 including a low pass filter, etc., is inserted to the output side of the inverter INV, the change rate of the output voltage of the inverter INV is eased (reduced), and the surge voltage is removed. Further, as another method, there is a method described in Patent Document 1. In Patent Document 1, a capacitor is connected to the direct current power supply line, and the switching surge is removed by the action of the LC resonance circuit (tank circuit) including the wiring inductance of the direct current power supply line, and the capacitor. However, according to the above-described conventional techniques, although the effects of suppressing symmetrical components of the surge voltage may be obtained, it is difficult to suppress a zero-component of the surge voltage.

With respect to the above, in Patent Document 2, a method is described in which, in order to provide a surge suppression circuit that is effective in suppressing the zero-phase component of the surge voltage, the circuit impedance is caused to match the cable impedance with respect to both the zero-component and the symmetrical components, one end of the surge suppression circuit is connected to the receiving end of the motor, and the other end is connected to the direct current voltage neutral point of the inverter. In this surge suppression circuit, one ends of resistors are connected to the corresponding phases of the receiving end, and the other ends are connected to a connection point in a star connection form via capacitors, and the connection point is connected to the direct current voltage neutral point.

CITATION LIST

Patent Document

[Patent Document 1] Japanese Unexamined Patent Application Publication No. 2010-41790 (paragraphs [0017]-[0026], FIG. 1, etc.)
[Patent Document 2] Japanese Patent No. 5145762 (paragraphs [0022]-[0028], FIG. 1, FIG. 2, etc.)

SUMMARY OF THE INVENTION

A surge suppression circuit according to an embodiment of the present invention is used in a motor drive system that drives a motor connected to the output end of the inverter via a cable according to the inverter, and the surge suppression circuit is used by being connected between the output end and the cable. Further, the surge suppression circuit includes an inductance (inductor) and a resistance (resistor). The resistance is connected in parallel with the inductance, and the resistance value of the resistance is set to match an impedance of a zero-phase component of the cable.

Further, in the surge suppression circuit according to an embodiment of the present invention, the resistance value of the resistance is set to be less than the impedance of the zero-phase component of the cable.

It should be noted that it is desirable that the inductance value L satisfy Formula 1.

$$L \geq (\sqrt{L_c C_c} l_c R)/2 \qquad \text{[Math 1](Formula 1)}$$

Here, "$L_c$" is an inductance value of a zero-phase component of the cable. "$C_c$" is a capacitance value of the zero-phase component of the cable. "$l_c$" is a cable length. "R" is a resistance value of the surge suppression circuit.

Further, it is desirable that a hollow magnetic body be penetrated or looped around by the cable or by a connection line that connects the output end of the inverter to the cable.

Further, it is desirable that a hollow magnetic body be penetrated or looped around by the cable or by a connection line that connects the output end of the inverter to the cable, and that the magnetic body be looped around by a resistance element.

Further, an inverter drive motor system according to an embodiment of the present invention includes an inverter that supplies power to the motor, a cable that connects the motor to the inverter, and any surge suppression circuit that is connected between the output end of the inverter and the cable.

Advantageous Effects of Invention

In an embodiment of the present invention, an output voltage of the inverter is divided by an impedance of the surge suppression circuit and a characteristic impedance of the cable. Therefore, a component, of a voltage applied to the cable, that changes steeply according to the switching of the switching elements, becomes a half of the output voltage of the inverter in the case where the resistance component of the surge suppression circuit is equal to the characteristic impedance of the cable. Furthermore, afterwards, the voltage applied to the cable gradually increases according to a time constant determined by a parallel circuit of the resistance and the inductance included in the surge suppression circuit.

With respect to the above, at the receiving end of the motor, the impedance of the motor is higher than the characteristic impedance of the cable, and thus, a reflection occurs at the receiving end of the motor due to the impedance mismatch. Therefore, a reflection voltage, that is comparable to the voltage value applied to the cable, occurs, and thus, a voltage applied to the receiving end of the motor becomes up to two times the voltage applied to the cable.

Now, as described above, the output voltage of the inverter is divided by the impedance of the surge suppression circuit and the characteristic impedance of the cable, and the divided voltage is applied to the cable. Therefore, the component, of the voltage applied to the receiving end of the motor, that changes steeply according to the switching of the switching elements, becomes comparable to the output voltage of the inverter, and is reduced to about a half as compared with a case in which the surge suppression circuit is not used. Further, similar to the voltage applied to the cable, the voltage applied to the receiving end of the motor gradually increases according to a time constant determined by a parallel circuit of the resistance and the inductance included in the surge suppression circuit.

Furthermore, a component that has been reflected at the receiving end of the motor is returned to the output end of the inverter via the cable. In an embodiment of the present invention, the negative reflection is smaller because the impedance mismatch between the cable and the inverter is reduced by the surge suppression circuit. Therefore, a reflection voltage component at the output end of the inverter is greatly reduced, and thus, a voltage fluctuation at the receiving end of the motor, generated by the reflection voltage component that is propagated again to the motor via the cable, is also reduced.

In this way, according to a surge suppression circuit according to an embodiment of the present invention, a component, of the surge voltage applied to the receiving end of the motor, that changes steeply according to the switching of the switching elements, becomes about equal to the output voltage of the inverter and is reduced to about a half as compared with the conventional case. At the same time, a peak value of the surge voltage, determined by the voltage component that increases gradually, is also reduced. In other words, by causing the voltage increasing speed to be gradual, not only it is possible to reduce the voltage share ratio of the winding near the receiving end of the motor, whose insulation stress is high, but also it is possible to reduce the peak value of the surge voltage.

Furthermore, the negative reflection at the output end of the inverter tends to be prevented from occurring, and thus, an amplitude value of a reflection voltage at the receiving end of the motor, which is generated according to a combination with the positive reflection at the receiving end of the motor, becomes smaller. According to the above, a high voltage is applied to the receiving end of the motor for a shorter period of time, and thus, it is possible to reduce the insulation stress applied to the winding. In addition to the above, it is possible to apply an embodiment of the present invention to a system in which a low-voltage small-capacity inverter with no direct current voltage neutral terminal is used. Further, connection work will be completed by simply connecting the surge suppression circuit to the output end of the inverter, and thus, it is possible to reduce the labor and time required for the connection work.

BRIEF DESCRIPTION OF THE DRAWINGS

FIG. 4 is a drawing illustrating a relationship between a value and an exponent for the base e in Formula 7, the value being obtained by dividing a peak value $V_{cmax}$ in Formula 7 by an open circuit voltage $V_i$ at the output end of the inverter according to an embodiment 3 of the present invention.

FIG. 5A is a drawing illustrating a surge suppression circuit according to an embodiment 4 of the present invention.

FIG. 5B is a drawing illustrating a surge suppression circuit according to an embodiment 4 of the present invention.

DETAILED DESCRIPTION OF THE PREFERRED EMBODIMENTS

Figure 1:
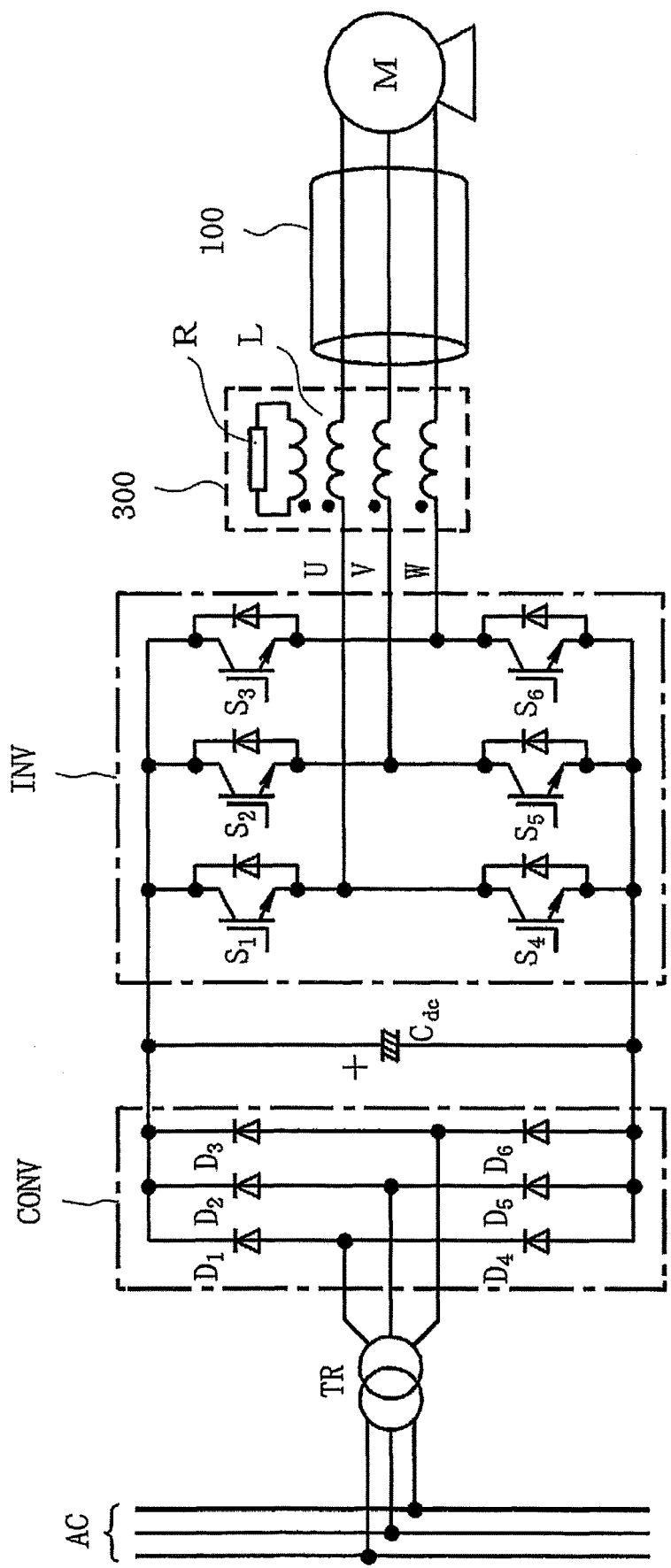
FIG. 1 is a diagram of an inverter drive motor system according to one or more embodiments of the present invention.

In order to apply the surge suppression circuit described in Patent Document 2, it is required that there is a direct current voltage neutral terminal of the inverter. However, in general, especially, in a low-voltage small-capacity inverter, there is no neutral terminal. Further, in this surge suppression circuit, one end is connected to the receiving end of the motor and the other end is connected to the direct current voltage neutral terminal, and thus, a large amount of work and time is required for the connecting work because of the bigger construction scale.

In view of the above, an object of the present invention is to provide a surge suppression circuit that is enabled to be applied to a low-voltage small-capacity inverter with no direct current voltage neutral terminal, and that is enabled to reduce the zero-component of the surge voltage according to only the connection to the output end of the inverter. Further, an object of the present invention is to provide an inverter drive motor system including this surge suppression circuit.

In the following, referring to the drawings, one or more embodiments of the present invention will be described. It should be noted that FIG. 1 through FIG. 7 are only intended to describe one or more embodiments of the present invention, and are not intended to limit the technical scope of the present invention.

Embodiment 1

Figure 8:
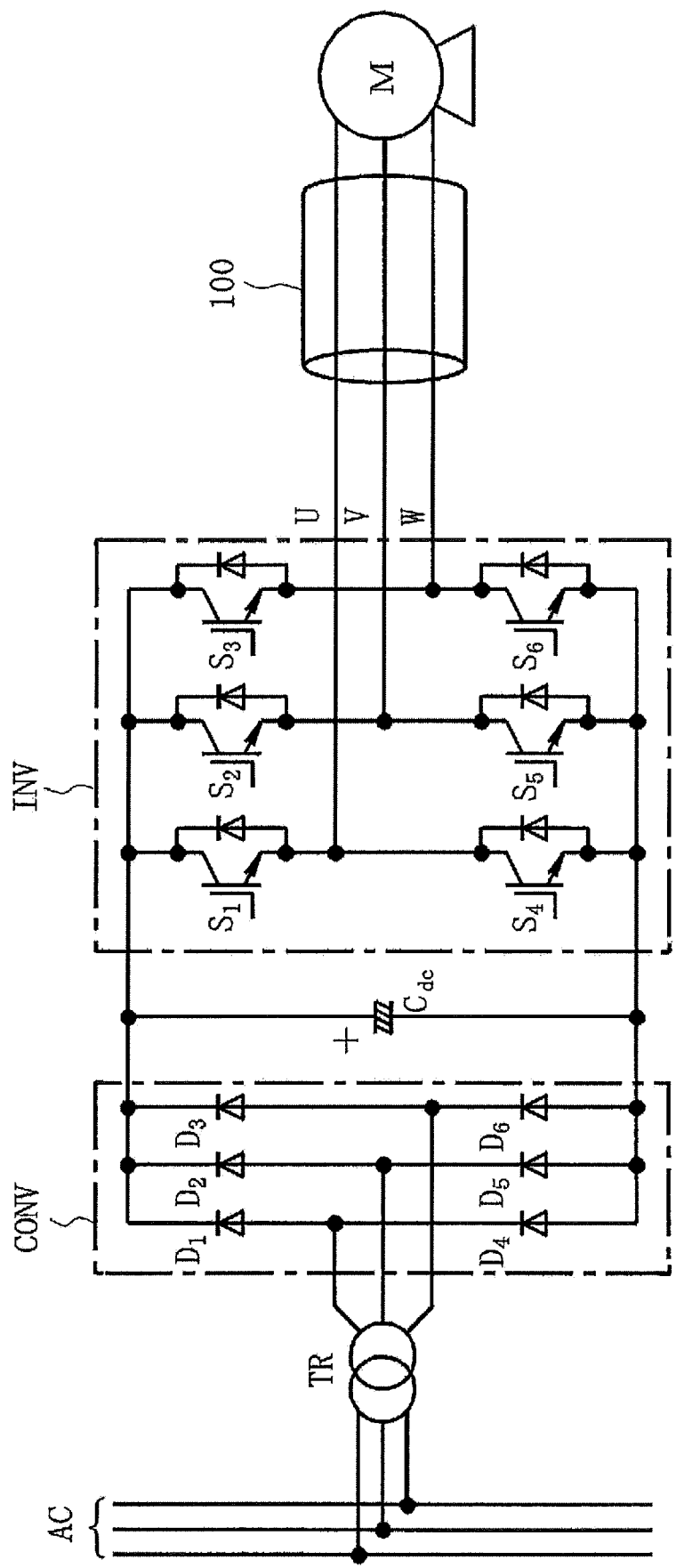
FIG. 8 is a schematic diagram of a conventional inverter drive motor system.

FIG. 1 is a diagram of an inverter drive motor system according to one or more embodiments of the present invention including an embodiment 1. This inverter drive motor system is different from the one illustrated in FIG. 8 in that a surge suppression circuit 300, which will be described below, is connected between an output end of the inverter INV and one end of a cable 100 that provides power to a motor M.

The surge suppression circuit 300 according to an embodiment 1 of the present invention includes a parallel circuit of a resistor R and a zero-phase reactor L. A value of the resistor R is set in such a way that the resistor R matches a characteristic impedance $Z_c$ of a zero-phase component of the cable 100, and the zero-phase reactor L is connected in parallel with the resistor R. Here, the value of the resistor R (it is assumed that the reference code "R" is not only used as a code for a part, but also used as a resistance value) is set as shown in Formula 2.

$$Z_c = \sqrt{L_c/C_c} \qquad \text{[Math 2](Formula 2)}$$

It should be noted that "Lc" is an inductance value of the zero-phase component of the cable 100, and "Cc" is a capacitance value of the zero-phase component of the cable 100. For example, actual measurement values of circuit constants of a three-core shielded cable with 5.5 [mm²] sectional area are: $L_c$=186 [nH/m], $C_c$=282 [pF/m]. Therefore, it is assumed that R is 26 [Ω], which is about the same as $Z_c$. It should be noted that any of a cement resistor, a wire wound resistor, and an enamel resistor may be used as the resistor R.

Further, it is assumed that a value of the zero-phase reactor L of the surge suppression circuit 300 (it is assumed that the reference code "L" is not only used as a code for a part, but also used as an inductance value) satisfies the above-described Formula 1. The zero-phase reactor L may include a ferrite core, etc. In FIG. 1, the surge suppression circuit 300 including the resistor R and the zero-phase reactor L is indicated as a single element. However, the surge suppression circuit 300 may include a plurality of elements connected in parallel or in series. In other words, the number of the resistors R and the zero-phase reactors L, and the connection method of the resistors R and the zero-phase reactors L may be selected so as to obtain an optimal surge suppression effects.

Next, an action of the surge suppression circuit 300 will be described while making reference to an example (FIG. 2) in which the zero-phase surge voltage (zero-phase component of the surge voltage) at the receiving end of the motor M in FIG. 1 is calculated theoretically. This calculation is performed by supplying power to an induction motor from the inverter INV via a 100 [m] three-core shielded cable with 5.5 [mm²] sectional area as described above. Further, the target is a system in which the surge suppression circuit 300, including a parallel circuit including a 26 [Ω] resistor R and a 30 [μH] zero-phase reactor L, is connected between an output end of the inverter INV and the cable 100.

Fluctuation of the zero-phase voltage at an output end of the inverter INV occurs according to the switching of the switching elements of the inverter INV. As indicated by a dashed line in FIG. 2, with the conventional technique in FIG. 8 that does not include the surge suppression circuit 300, a voltage at the output end of the inverter INV is directly applied to the cable 100 and is propagated in the cable 100. On the other hand, according to an embodiment 1 of the present invention including the surge suppression circuit 300, a voltage at the output end of the inverter INV is divided by the impedance of the surge suppression circuit 300 and the characteristic impedance of the cable 100.

Here, as described above, the surge suppression circuit 300 includes a parallel circuit including the resistor R and the zero-phase reactor L. Therefore, the initial value of the voltage applied to the cable 100 is a value obtained by dividing the voltage at the output end of the inverter INV by using the resistance value (26 [Ω]) of the surge suppression circuit 300 and the characteristic impedance value (26 [Ω]) of the cable 100, that is, a value of 0.5 times the voltage at the output end of the inverter INV. Further, as the time elapses, the voltage applied to the cable 100 increases according to the time constant (R/L) of the surge suppression circuit 300.

In this way, when the voltage applied to the cable 100 is propagated in the cable 100 and arrives at the receiving end of the motor M, a reflection that is determined by the characteristic impedance of the cable 100 and the input impedance of the motor M occurs. According to the theoretical calculation for a combination of the cable 100 and the motor M, the initial value of a reflection coefficient is about 0.85. Therefore, the initial value of the surge voltage applied to the receiving end of the motor M is a combination value in which a voltage component that has been propagated in the cable 100 and a reflection voltage component are combined. The combination value is about 0.9 (=0.5*(1+0.85)) times the voltage at the output end of the inverter INV.

Further, as the time elapses, the voltage applied to the cable 100 increases, and, as the voltage applied to the cable 100 increases, the voltage at the receiving end of the motor M increases. The increase of the voltage at the receiving end M continues during a time in which the reflection wave completes a to-and-fro propagation of the cable 100 (in this calculation example, time for the to-and-fro propagation of the 100 [m] three-core shielded cable is about 1.45 [μs]). The voltage at the receiving end of the motor M at the time of the voltage increase completion is about 1.4 times the maximum value of the voltage at the output end of the inverter INV. Afterwards, the voltage at the receiving end of the motor M gradually converges to a value equivalent to the voltage at the output end of the inverter INV according to a reflection at the inverter INV side end of the cable 100, according to a reflection at the motor M side end of the cable 100, according to the resistance value R of the surge suppression circuit 300, and according to the inductance value L of the surge suppression circuit 300, etc.

Figure 2:
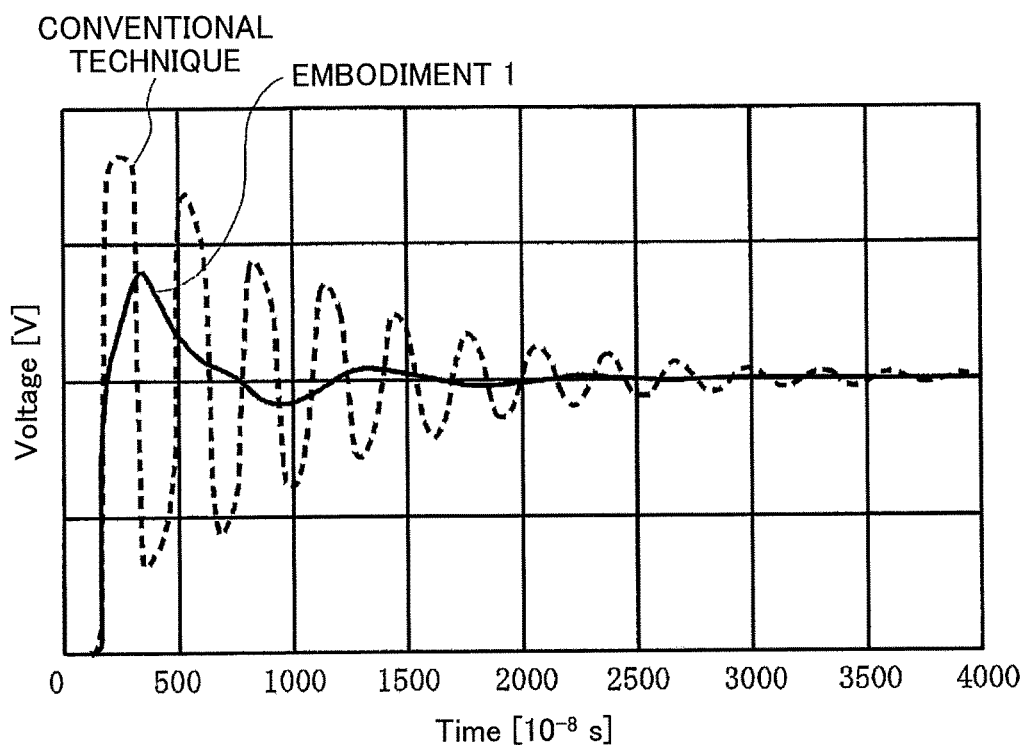
FIG. 2 is a wave form diagram of a case in which the zero-phase surge voltage at the receiving end of the motor is calculated theoretically according to an embodiment 1 of the present invention.

Further, a period, during which the voltage at the receiving end of the motor M exceeds the voltage at the output end of the inverter INV+20 [%], is referred to as a "high-voltage application period". In the case where a surge suppression circuit 300 is connected according to an embodiment 1 of the present invention, the high-voltage application period is about 2.5 [μs] as illustrated in FIG. 2.

Figure 9:
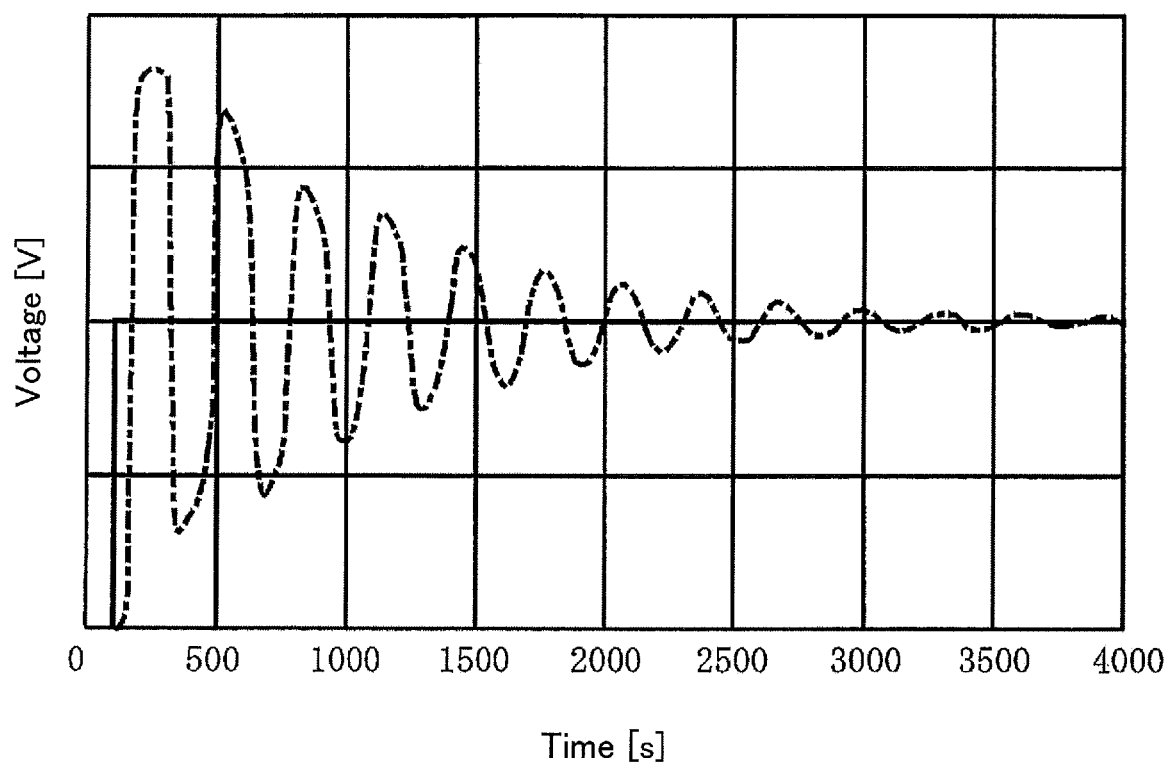
FIG. 9 is a wave form diagram of a case in which the surge voltage at the receiving end of the motor in FIG. 8 is calculated theoretically.
Figure 10:
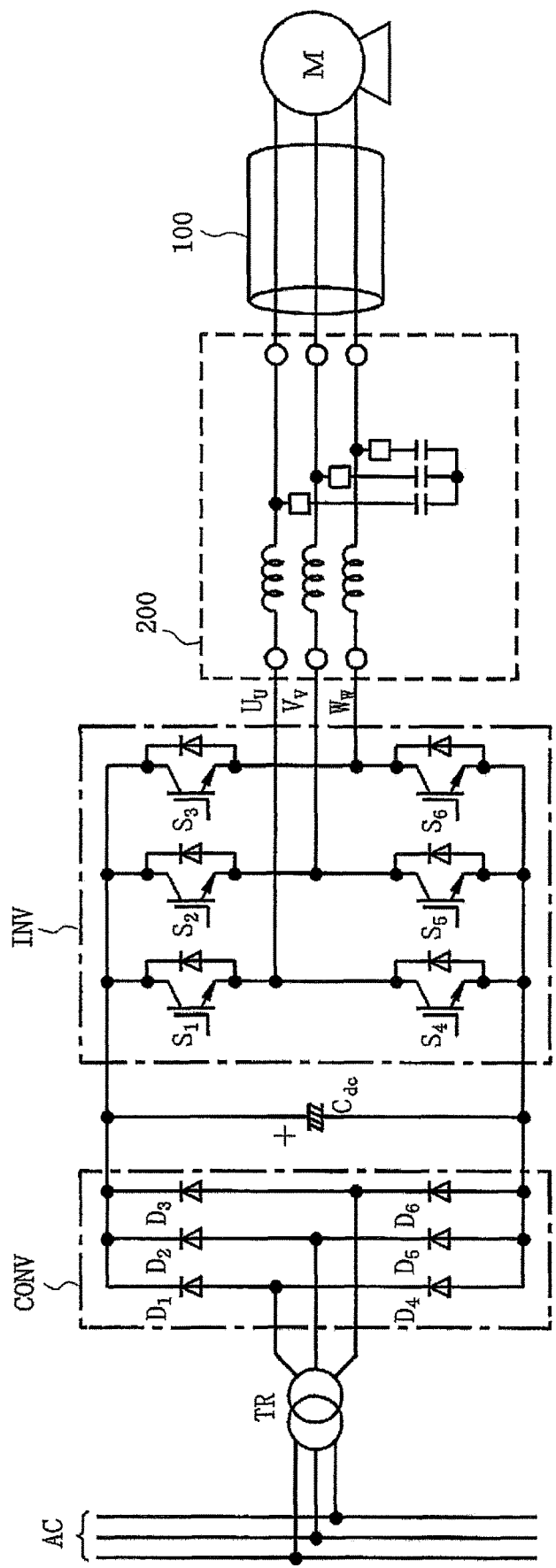
FIG. 10 is a schematic diagram of a conventional inverter drive motor system including a surge suppression circuit.

As described above, and as illustrated in FIG. 2, in an embodiment 1 of the present invention, the surge suppression circuit 300, including a predetermined resistance value R and an inductance value L, is included between the output end of the inverter INV and one end of the cable 100. According to the above, a component, of the surge voltage applied to the receiving end of the motor M, that changes steeply according to the switching operations of the inverter INV, is about 0.9 times the output voltage value of the inverter INV. The component is reduced to about 50 [%] with respect to the "about 1.85 times" in the conventional technique (FIG. 9). Further, the maximum value of the surge voltage is about 1.3 times the output voltage value of the inverter INV. The maximum value of the surge voltage is reduced to about 70 [%] with respect to the "about 1.85 times" in the conventional technique (FIG. 9). Further, the high-voltage application period is about 2.5 [μs]. The high-voltage application period is reduced to about 40 [%] with respect to the "about 6 [μs]" in the conventional technique (FIG. 9).

Embodiment 2

Next, an embodiment 2 of the present invention will be described. The embodiment 2 is different from the embodiment 1 in that, in the embodiment 1, the resistance value R of the surge suppression circuit 300 is set to match the characteristic impedance $Z_c$ of the zero-phase component of the cable 100, but, in the embodiment 2, as indicated in Formula 3, the resistance value R is set to be equal to or less than $Z_c$.

$$R \leq Z_c = \sqrt{L_c/C_c} \qquad \text{[Math 3](Formula 3)}$$

In Formula 3, the same as before, $L_c$ is an inductance value of the zero-phase component of the cable, and $C_c$ is a capacitance value of the zero-phase component of the cable.

Further, similar to the embodiment 1, the inductance value L of the surge suppression circuit 300 is set according to Formula 1. According to the embodiment 2, compared with the embodiment 1, there is an advantage in that the range of the resistance value R of the surge suppression circuit 300 is wider, and thus, the design freedom is increased.

Next, an action of the surge suppression circuit 300 according to an embodiment 2 of the present invention will be described while making reference to an example (FIG. 3) in which the zero-phase surge voltage at the receiving end of the motor M in FIG. 1 is calculated theoretically. It should be noted that, similar to the embodiment 1, this calculation is performed by supplying power to an induction motor from the inverter INV via a 100 [m] three-core shielded cable with 5.5 [mm²] sectional area. Further, the target is a system in which the surge suppression circuit 300, including a parallel circuit including a 15 [Ω] resistor R and a 30 [μH] zero-phase reactor L, is connected between an output end of the inverter INV and the cable 100.

In the embodiment 2, the initial value of the voltage applied to the cable 100 from the output end of the inverter INV is a value obtained by dividing the voltage at the output end of the inverter INV by using the resistance value (15 [Ω]) of the surge suppression circuit 300 and the characteristic impedance value (26 [Ω]) of the cable 100, that is, a value of 0.63 times the voltage at the output end of the inverter INV. Further, this voltage increases, as the time elapses, according to the time constant (R/L) based on the resistance value R and the inductance value L of the surge suppression circuit 300.

When the voltage applied to the cable 100 is propagated in the cable 100 and arrives at the receiving end of the motor M, a reflection, determined by the characteristic impedance of the cable 100 and the input impedance of the motor M, occurs. According to the theoretical calculation for a combination of the cable 100 and the motor M, the initial value of a reflection coefficient is about 0.85. Therefore, the initial value of the surge voltage applied to the receiving end of the motor M is a combination value in which a voltage component that has been propagated in the cable 100 and a reflection voltage component are combined. The combination value is about 1.17 (=0.63*(1+0.85)) times the voltage at the output end of the inverter.

Afterwards, as the voltage applied to the cable 100 increases, the voltage at the receiving end of the motor M increases. The increase of the voltage continues during a time in which the reflection wave completes a to-and-fro propagation of the cable 100 (the same as before, about 1.45 [μs]). The voltage at the receiving end of the motor M at the time of completion of the voltage increase is about 1.42 times the maximum value of the voltage at the output end of the inverter INV. Afterwards, the voltage at the receiving end of the motor M gradually converges to a value equivalent to the voltage at the output end of the inverter INV according to the reflection at the inverter INV side end of the cable 100, according to the reflection at the motor M side end of the cable 100, according to the resistance value R of the surge suppression circuit 300, and according to the inductance value L of the surge suppression circuit 300.

Figure 3:
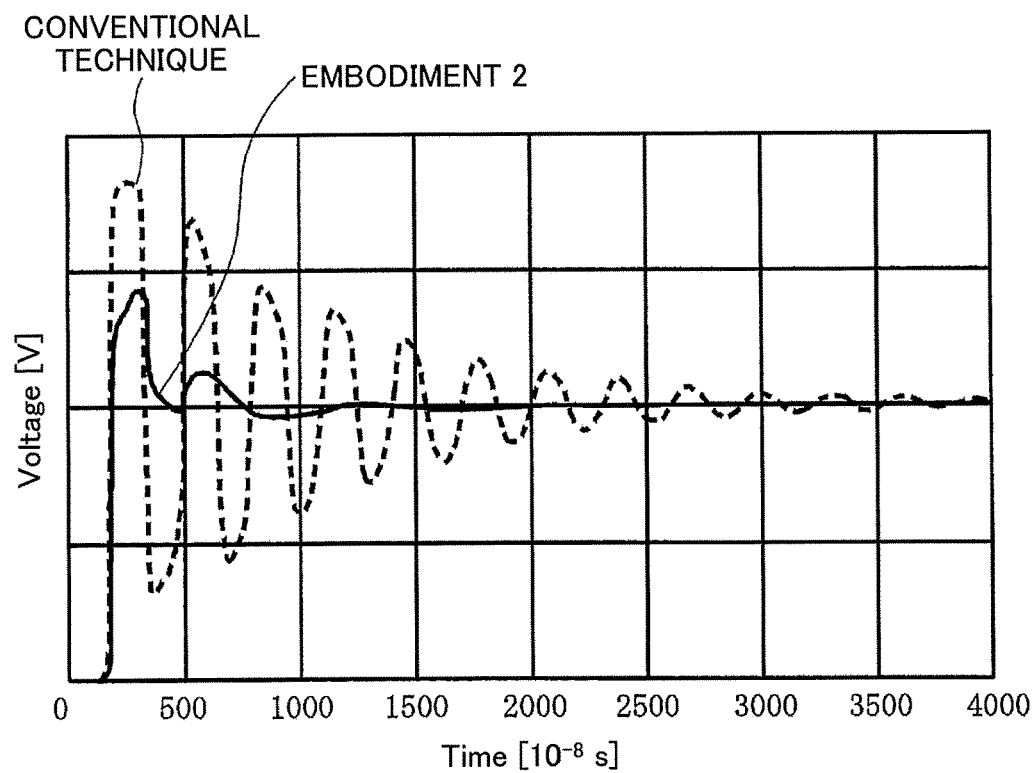
FIG. 3 is a wave form diagram of a case in which the zero-phase surge voltage at the receiving end of the motor is calculated theoretically according to an embodiment 2 of the present invention.
Figure 6:
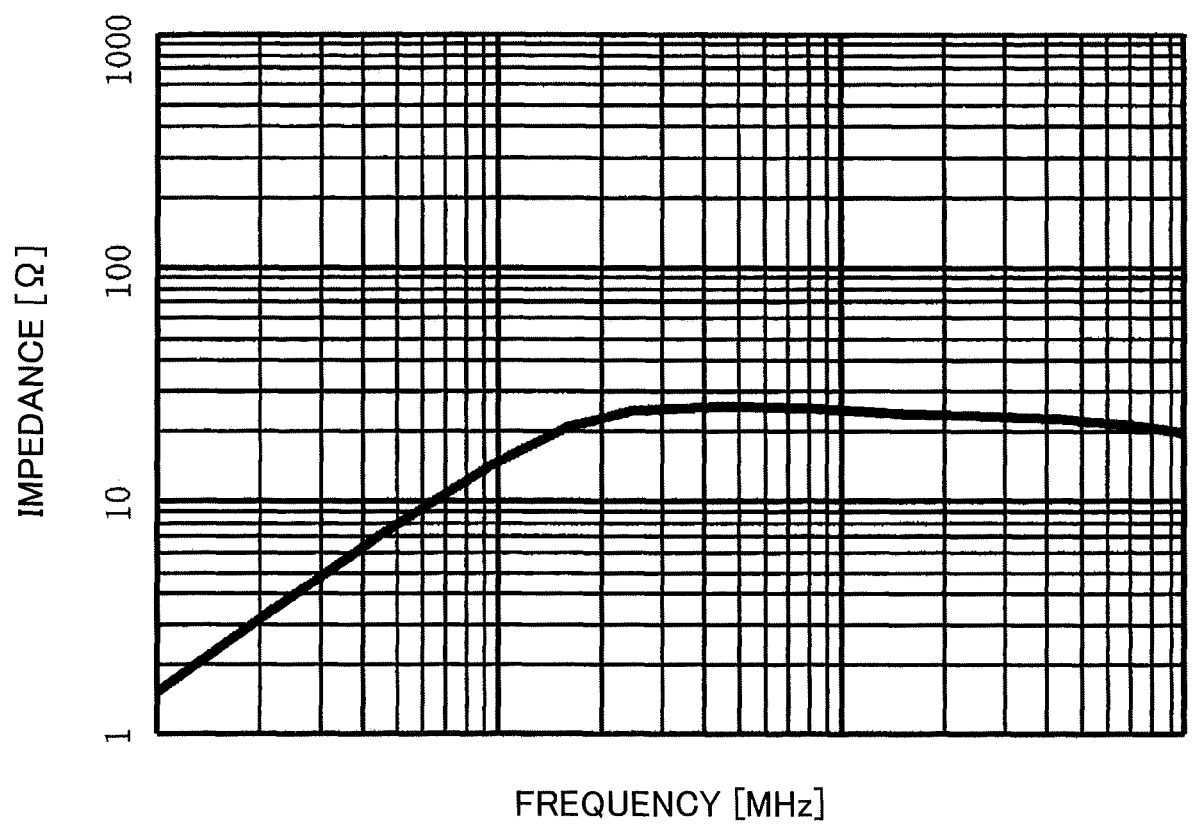
FIG. 6 is a drawing illustrating an example of characteristics of a magnetic body.

Further, a period, during which the voltage at the receiving end of the motor M exceeds the voltage at the output end of the inverter INV+20 [%], is referred to as a "high-voltage application period". In the case where the surge suppression circuit 300 is connected according to an embodiment 2 of the present invention, the high-voltage application period is about 1.5 [μs] as illustrated in FIG. 3.

As described above, and as illustrated in FIG. 3, in an embodiment 2 of the present invention, a surge suppression circuit 300, including a predetermined resistance value R and a predetermined inductance value L, is included between the output end of the inverter INV and one end of the cable 100. According to the above, a component, of the surge voltage applied to the receiving end of the motor M, that changes steeply according to the switching operations of the inverter INV, is about 1.17 times the output voltage value of the inverter INV. The component is reduced to about 63 [%] with respect to the "about 1.85 times" in the conventional technique (FIG. 9). Further, the maximum value of the surge voltage is about 1.42 times the output voltage value of the inverter INV. The maximum value of the surge voltage is reduced to about 77 [%] with respect to the "about 1.85 times" in the conventional technique (FIG. 9). Further, the high-voltage application period is about 1.5 [μs]. The high-voltage application period is reduced to about 25[%] with respect to the "about 6 [μs]" in the conventional technique (FIG. 9).

Embodiment 3

The feature of an embodiment 3 of the present invention includes that the inductance value L of the zero-phase reactor of the surge suppression circuit 300 is set as shown in Formula 4. It should be noted that Formula 4 is substantially the same as Formula 1. However, Formula 4 is illustrated again in order to provide better understanding.

$$L/R \geq (\sqrt{L_c C_c} l_c)/2 \qquad \text{[Math 4](Formula 4)}$$

The same as before, $L_c$ is an inductance value of a zero-phase component of the cable 100, $C_c$ is a capacitance value of a zero-phase component of the cable 100, $l_c$ is a length of the cable 100, and R is a resistance value of the surge suppression circuit 300.

Next, an action of the surge suppression circuit 300 according to an embodiment 3 of the present invention will be described while making reference to FIG. 2. It should be noted that the calculation is based on the following. Similar to the embodiment 1, the surge suppression circuit 300 including the resistance value R=26 [Ω] and the inductance value L=30 [μH/m] is used. The circuit constants related to the cable 100 is the same as the embodiment 1 ($C_c$=282 [pF/m], $L_c$=186 [nH/m], lc=100 [m]). When these values are substituted for Formula 4, "L>9.42 [μH/m]" is obtained. The calculation target condition (L=30 [μH/m]) satisfies "L>9.42 [μH/m]".

Similar to the embodiment 1, the initial value of the voltage applied to the cable 100 according to the switching of the inverter INV is a value obtained by dividing the voltage at the output end of the inverter INV by using the resistance value (26 [Ω]) of the surge suppression circuit 300 and the characteristic impedance value (26 [Ω]) of the cable 100, that is, a value of 0.5 times the voltage at the output end of the inverter INV. Further, as the time elapses, the voltage applied to the cable 100 increases according to the time constant (R/L) of the surge suppression circuit 300.

Here, when an open circuit voltage at the output end of the inverter INV is denoted by "$V_i$", a voltage applied to the cable 100 is denoted by "$V_c$", and, an elapsed time after a voltage of Vi/2 has been applied to the cable 100 is denoted by "t", the transition of $V_c$, becoming a peak value as a function of time "t", is represented by Formula 5.

$$V_c = V_i(2 - e^{-tR/L})/2 \qquad \text{[Math 5](Formula 5)}$$

Further, the time T when $V_c$ becomes the peak value is represented by Formula 6.

$$T = 2l_c\sqrt{L_c C_c} \qquad \text{[Math 6] (Formula 6)}$$

The peak value $V_{cmax}$ of $V_c$, obtained by substituting Formula 6 for the time "t" in Formula 5, is represented by Formula 7.

[Math 7]

$$V_{cmax} = V_i\left(2 - e^{-2l_c R/L\sqrt{L_c C_c}}\right)/2 \qquad \text{(Formula 7)}$$

Here, it is assumed that a value, obtained by dividing the peak value $V_{cmax}$ indicated by Formula 7 by the open circuit voltage $V_i$ of the output end of the inverter INV, is denoted by "A" indicated by Formula 8, and an exponent for the base "e" in Formula 7 is denoted by "B" indicated by Formula 9. The relationship between A and B is illustrated in FIG. 4.

[Math 8]

$$A = \left(2 - e^{-2l_c R/L\sqrt{L_c C_c}}\right)/2 \qquad \text{(Formula 8)}$$

-continued

[Math 9]

$$B = 2l_c R/L\sqrt{L_c C_c}$$ (Formula 9)

According to FIG. 4, it is shown that, when "B" indicated by Formula 9 increases, "A", that has a proportional relationship with $V_c$, indicated by Formula 8, increases in an exponential manner, and converges to 1.

With respect to the above, the effects of the reduced peak value of the surge voltage according to the surge suppression circuit 300 become greater as "A" indicated by Formula 8 becomes smaller, and become smaller as "A" becomes closer to 1. With respect to the above, according to the relationship illustrated in FIG. 4, the constant of the surge suppression circuit 300 is set as shown in Formula 10 and Formula 11 (equivalent transformation formula of Formula 10) within a range of the constant prior to convergence of "A" (indicated by Formula 8) to 1. According to the above, it is possible to obtain significant effects of the reduced peak value of the surge voltage.

$$2l_c R/L\sqrt{L_c C_c} \leq 4$$ [Math 10](Formula 10)

$$L/R \geq \sqrt{L_c C_c} l_x/2$$ [Math 11](Formula 11)

Embodiment 4

Next, an embodiment 4 of the present invention will be described while making reference to FIG. 5A and FIG. 5B. In the embodiment 4, the surge suppression circuit 300 illustrated in the embodiments 1 to 3 is obtained by causing the hollow magnetic body to be penetrated by a cable or a connection line. The cable connects the output end of the inverter INV to the receiving end of the motor M, and the connection line connects the output end of the inverter INV to the cable.

FIG. 5A illustrates an example of a surge suppression circuit according to an embodiment 4 of the present invention. In FIG. 5A, 100 indicates a three-core cable, 101 indicates cable core wires of the three phases, 102 indicates a sheath, and 301 indicates a magnetic body such as a soft ferrite that is penetrated by the cable 100. In this example, the magnetic body 301 is a zero-phase reactor acting as an inductance with respect to the three-phase added value, i.e., the zero-phase component.

Further, FIG. 5B illustrates another example of a surge suppression circuit according to an embodiment 4 of the present invention. In FIG. 5B, 103 indicates three-phase connection lines, and each of the connection lines includes a cable core wire and a sheath. Further, 302 indicates a magnetic body such as a soft ferrite that is penetrated by the connection lines 103. Similar to FIG. 5A, the magnetic body 301 is a zero-phase reactor acting as an inductance with respect to the three-phase added value, i.e., the zero-phase component.

With respect to the above, a core loss occurs when the magnetic body is excited by an alternating current. Further, permeability of the magnetic body is dependent on the frequency, and the permeability decreases when the frequency exceeds a certain frequency. An example of characteristics of the magnetic body described above is illustrated in FIG. 6 as a relationship between the impedance and the frequency. According to FIG. 6, in a frequency band equal to or less than 0.1 [MHz], the magnetic body has inductance characteristics in which the impedance increases in proportion to the frequency increase, and, in a frequency band equal to or more than 0.2 [MHz], the magnetic body has resistance characteristics that have little dependency on the frequency. In other words, it is understood that the magnetic body has impedance characteristics similar to a circuit including a parallel circuit of inductance and resistance.

In the embodiment 4, by using the above-described characteristics of the magnetic body, the magnetic body 301 or 302 is caused to be penetrated by all phases of power lines such as the cable 100 or the connection lines 103. According to the above, the surge suppression circuit has impedance characteristics equivalent to those of the parallel circuit of the inductance and the resistance.

It should be noted that FIG. 5A or FIG. 5B illustrates a case in which a single magnetic body 301 or 302 is caused to be penetrated by the power lines. However, an embodiment of the present invention is not limited to the above-described case. For example, an embodiment of the present invention may include a modified example described below:

The number of turns of the power lines may be increased (the magnetic body is looped around by the power lines).

The number of magnetic bodies may be increased.

Different types of magnetic bodies may be combined.

A plurality of conductors are connected in parallel and included in one of the phases of the power lines.

In a motor drive system according to a single phase inverter, a hollow magnetic body is penetrated or looped around by a single phase power line.

A cable with a ground line or with shielding is used. When a cable with a ground line or with shielding is used, the magnetic body is penetrated or looped around by the power line excluding the ground line or the shielding.

Embodiment 5

Figure 7:
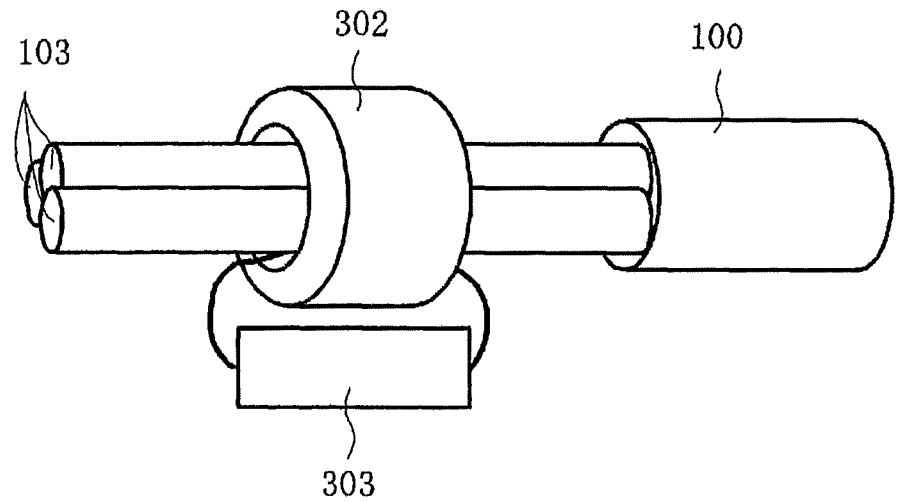
FIG. 7 is a drawing illustrating a surge suppression circuit according to an embodiment 5 of the present invention.

Next, an embodiment 5 of the present invention will be described while making reference to FIG. 7. The embodiment 5 is different from the embodiment 4 in that the magnetic body is looped around by both ends of a resistance element. In FIG. 7, 303 indicates a resistance element by which the magnetic body 302 is looped around. It should be noted that FIG. 7 corresponds to FIG. 5B, to which the resistance element 303 is added. However, the resistance element 303 may be added to FIG. 5A.

As described in the embodiment 4, the magnetic body has inductance characteristics and resistance characteristics. Further, it is possible to change the circuit constant of the surge suppression circuit by using a method of, for example, changing the number of the windings of the power line around the magnetic body, or, combining different types of magnetic bodies. However, when the number of the windings of the power line is changed, or, the types of the magnetic bodies is changed, not only the inductance component but also the resistance component is changed, and thus, there may be a case in which it is difficult to obtain a desired circuit constant.

In contrast, in the embodiment 5, it is possible to change only the value of a resistance component of the surge suppression circuit by causing the magnetic body 302 to be looped around by both ends of the resistance element 303. Therefore, it is possible to obtain a surge suppression circuit with a desired circuit constant easily and with a small number of circuit elements. It should be noted that, as the resistance element 303, an enamel resistor, a cement resistor, etc., may be used.

In the above-described embodiments, as the switching elements of the inverter INV, other than an IGBT illustrated in FIG. 1, self-turn-off devices such as a MOSFET (Metal-Oxide-Semiconductor Field Effect Transistor) may be used. Further, the converter CONV may be, other than the diode rectifier circuit, a PWM converter including switching elements and a control circuit for the switching elements. In a surge suppression circuit and an inverter drive motor system according to one or more embodiments of the present invention, configurations of the converter and the inverter, control methods thereof, etc., are not limited as long as a surge suppression circuit, that satisfies Formula 2 or 3, and further satisfies Formula 4, is connected near the output end of the inverter INV. Furthermore, a surge suppression circuit and an inverter drive motor system according to one or more embodiments of the present invention are not limited to the above-described embodiments, and various modifications may be possible without departing from the subject matter of the present invention.

INDUSTRIAL APPLICABILITY

The present invention may be applied to a motor system that uses, not only what is called a two-level inverter, but also a multi-level inverter such as a three-level inverter, and may be applied not only to a three-phase inverter, but also to a single-phase inverter. Further, the present invention may be applied to a motor system that drives a motor by distributing electricity from a single converter to a plurality of inverters.

DESCRIPTION OF THE REFERENCE NUMERALS

AC: three-phase alternating current (AC) power supply
TR: transformer
CONV: converter
$C_{dc}$: smoothing capacitor
INV: inverter
M: motor
D1-D6: diode
S1-S6: semiconductor switching element
100: cable
101: cable core wire
102: sheath
103: connection line
300: surge suppression circuit
301, 302: magnetic body
303: resistance element

What is claimed is:

1. A surge suppression circuit that is used for a motor drive system driving a motor connected to an output end of an inverter via a cable according to the inverter, and that is connected between the output end and the cable, the surge suppression circuit suppressing a component that changes steeply according to switching of a switching element included in the inverter, the surge suppression circuit comprising:
 an inductance; and
 a resistance that is connected in parallel with the inductance,
 wherein a resistance value of the resistance is set so as to match an impedance of a zero-phase component of the cable, and
 wherein a value L of the inductance satisfies Formula 1:

$$L \geq (\sqrt{L_c C_c} l_c R)/2 \quad \text{[Math 1](Formula 1)}$$

wherein,
 $L_c$ is an inductance value of a zero-phase component of the cable,
 $C_c$ is a capacitance value of the zero-phase component of the cable,
 $l_c$ is a cable length, and
 R is a resistance value of the surge suppression circuit.

2. The surge suppression circuit according to claim 1, wherein a hollow magnetic body is penetrated or looped around by the cable or by a connection line connecting the output end of the inverter to the cable.

3. The surge suppression circuit according to claim 1, wherein a hollow magnetic body is penetrated or looped around by the cable or by a connection line connecting the output end of the inverter to the cable, and wherein the magnetic body is looped around by a resistance element.

4. An inverter drive motor system comprising: an inverter that supplies power to a motor;
 a cable that connects the motor to the inverter; and
 the surge suppression circuit according to claim 1 connected between the output end of the inverter and the cable.

5. A surge suppression circuit that is used for a motor drive system driving a motor connected to an output end of an inverter via a cable according to the inverter, and that is connected between the output end and the cable, the surge suppression circuit suppressing a component that changes steeply according to switching of a switching element included in the inverter, the surge suppression circuit comprising:
 an inductance; and
 a resistance that is connected in parallel with the inductance,
 wherein a resistance value of the resistance is set so as to be less than an impedance of a zero-phase component of the cable, and
 wherein a value L of the inductance satisfies Formula 1:

$$L \geq (\sqrt{L_c C_c} l_c R)/2 \quad \text{[Math 1](Formula 1)}$$

wherein,
 $L_c$ is an inductance value of a zero-phase component of the cable,
 $C_c$ is a capacitance value of the zero-phase component of the cable,
 $l_c$ is a cable length, and
 R is a resistance value of the surge suppression circuit.

6. The surge suppression circuit according to claim 5, wherein a hollow magnetic body is penetrated or looped around by the cable or by a connection line connecting the output end of the inverter to the cable.

7. The surge suppression circuit according to claim 5, wherein a hollow magnetic body is penetrated or looped around by the cable or by a connection line connecting the output end of the inverter to the cable, and wherein the magnetic body is looped around by a resistance element.

8. An inverter drive motor system comprising: an inverter that supplies power to a motor;
 a cable that connects the motor to the inverter; and
 the surge suppression circuit according to claim 5 connected between the output end of the inverter and the cable.

* * * * *